US011368570B1

(12) United States Patent
Gall et al.

(10) Patent No.: US 11,368,570 B1
(45) Date of Patent: *Jun. 21, 2022

(54) MULTI-CALL MANAGEMENT SYSTEM AND METHOD

(71) Applicants: Erik Gall, Perry, OK (US); Ryan Herman, Overland Park, KS (US); Kaden Gall, Perry, OK (US)

(72) Inventors: Erik Gall, Perry, OK (US); Ryan Herman, Overland Park, KS (US); Kaden Gall, Perry, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 17/089,296

(22) Filed: Nov. 4, 2020

(51) Int. Cl.
*H04M 1/72403* (2021.01)
*H04M 3/56* (2006.01)

(52) U.S. Cl.
CPC ....... *H04M 1/72403* (2021.01); *H04M 3/563* (2013.01)

(58) Field of Classification Search
CPC .... H04M 1/72403; H04M 3/563; H04M 3/42; H04M 3/42382; H04M 3/42365; H04M 3/356; H04L 65/40; H04L 65/4007
See application file for complete search history.

(56) References Cited

U.S. PATENT DOCUMENTS

| | | | |
|---|---|---|---|
| 6,650,748 B1 | 11/2003 | Edwards | |
| 10,375,239 B1* | 8/2019 | Gall | H04M 3/5183 |
| 10,951,756 B1* | 3/2021 | Silverstein | H04M 3/42161 |
| 2006/0154654 A1 | 7/2006 | Jabbour | |
| 2012/0084111 A1 | 4/2012 | Aggarwal | |
| 2013/0003943 A1 | 1/2013 | Munns | |
| 2013/0279680 A1* | 10/2013 | Su | H04M 7/0045 379/204.01 |
| 2014/0273974 A1* | 9/2014 | Varghese | H04W 88/06 455/412.1 |
| 2015/0024717 A1* | 1/2015 | Kochhar | H04L 65/1069 455/413 |
| 2020/0007477 A1 | 1/2020 | Nair | |

* cited by examiner

*Primary Examiner* — Ankur Jain
*Assistant Examiner* — Angelica M Perez
(74) *Attorney, Agent, or Firm* — Leavitt Eldredge Law Firm

(57) ABSTRACT

A multi-call management system for allowing a user to interact with multiple calls by providing the user with multiple options for managing the calls, both inbound calls and outbound calls.

19 Claims, 11 Drawing Sheets

MULTI-CALL MANAGEMENT SYSTEM AND METHOD

BACKGROUND

1. Field of the Invention

The present invention relates generally to calling systems, and more specifically, to systems for managing multiple calls, both inbound calls and outbound calls, wherein the user can communicate effectively and efficiently with multiple callers simultaneously and live.

2. Description of Related Art

Calling systems are well known in the art and are effective means of communication. For example, FIG. 1 depicts a conventional calling system 101, wherein a user initiates or receives a first call, as shown with box 103. The user will then potentially receive a second call, while on the first call, as shown with box 105. The second call is then directed to voicemail, wherein the user may receive a voicemail, as shown with box 107.

One of the problems commonly associated with system 101 is limited use. For example, the user has limited control over the second call and has limited options to handle multiple calls.

Accordingly, although great strides have been made in the area of calling systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
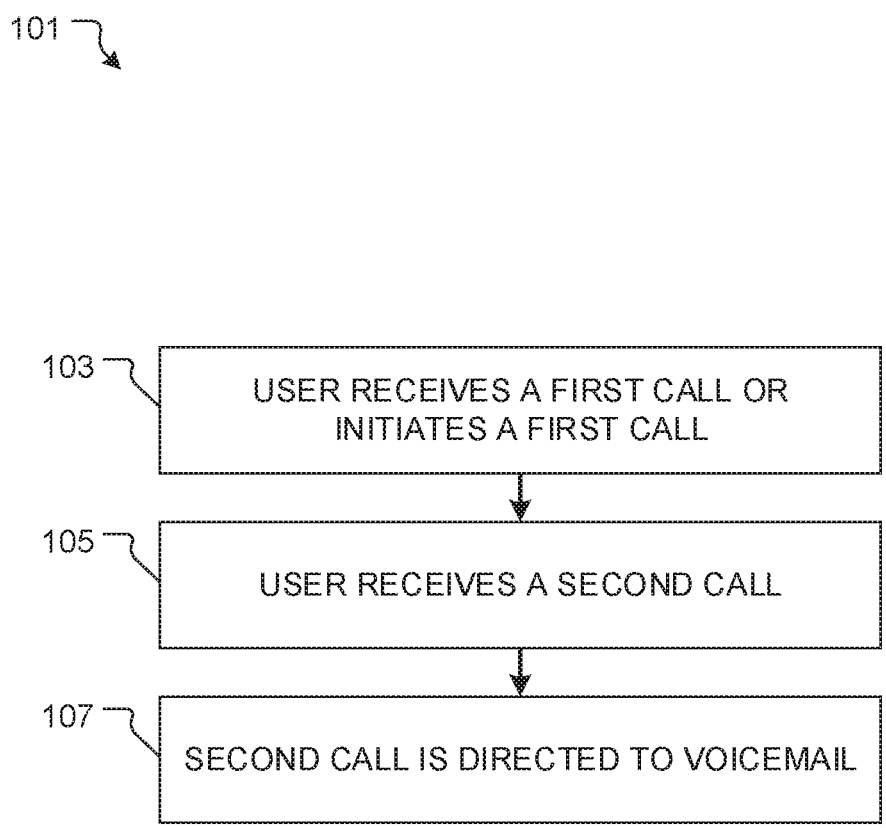
FIG. 1 is a flowchart of a common calling system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional calling systems. Specifically, the invention of the present application enables a user to manage multiple calls, both inbound and outbound. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
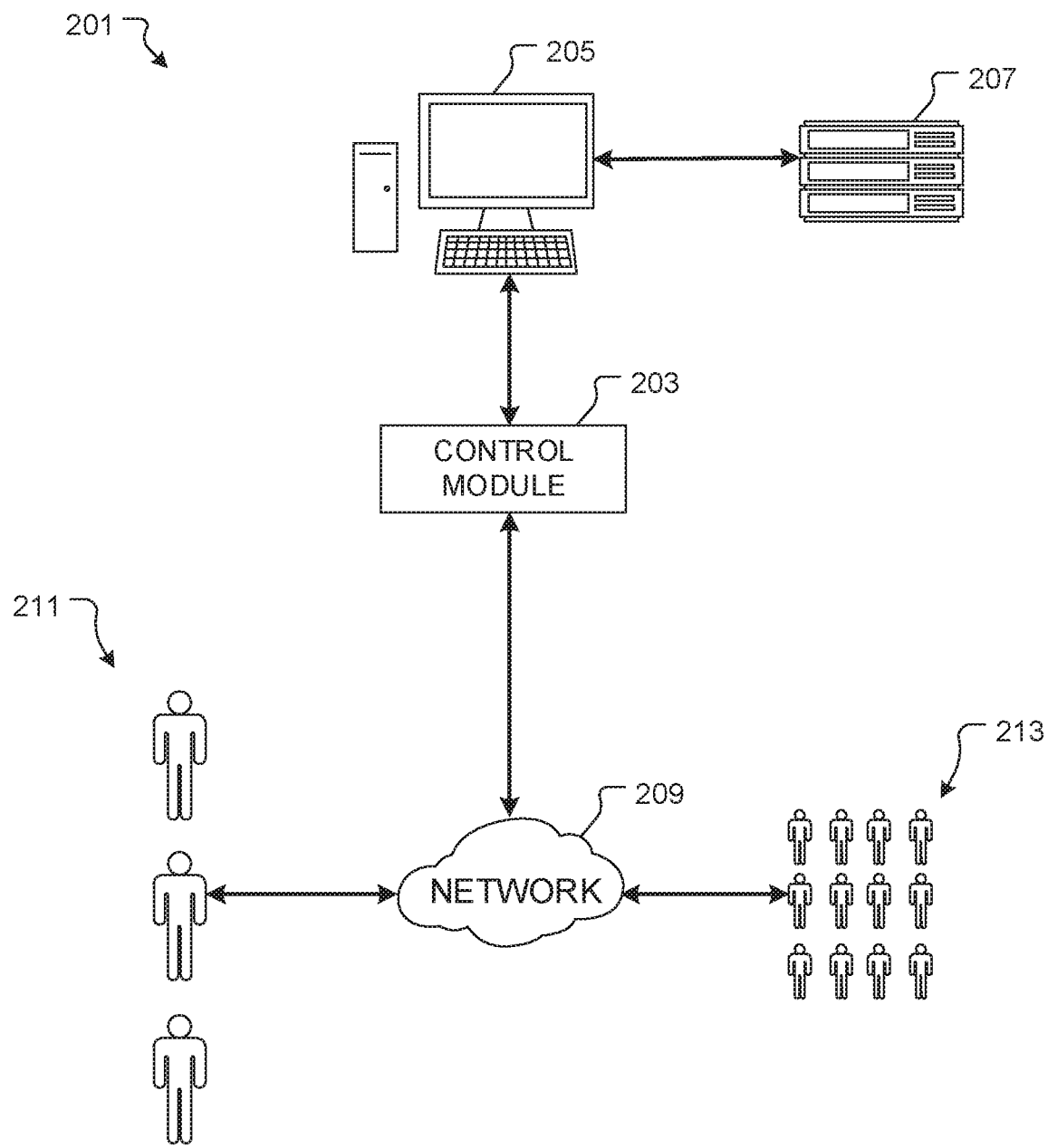
FIG. 2 is a diagram of an agent directed dialing system in accordance with a first embodiment of the present application.

Referring now to the drawings wherein like reference characters identify corresponding or similar elements throughout the several views, FIG. 2 depicts a diagram of an first embodiment of an agent directed dialing system in accordance with the present application. It will be appreciated that system 201 overcomes one or more of the above-listed problems commonly associated with conventional outbound calling systems.

In the contemplated embodiment, system 201 includes a control module 203 running on a CPU 205 having a database 207. The control module 203 in communication with agents 211 and people 213 via a network 209. It is contemplated that any user, person or the like interacting with the control module 203 is considered an agent 211 for this disclosure e.g. a supervisor or administrator.

Figure 3:
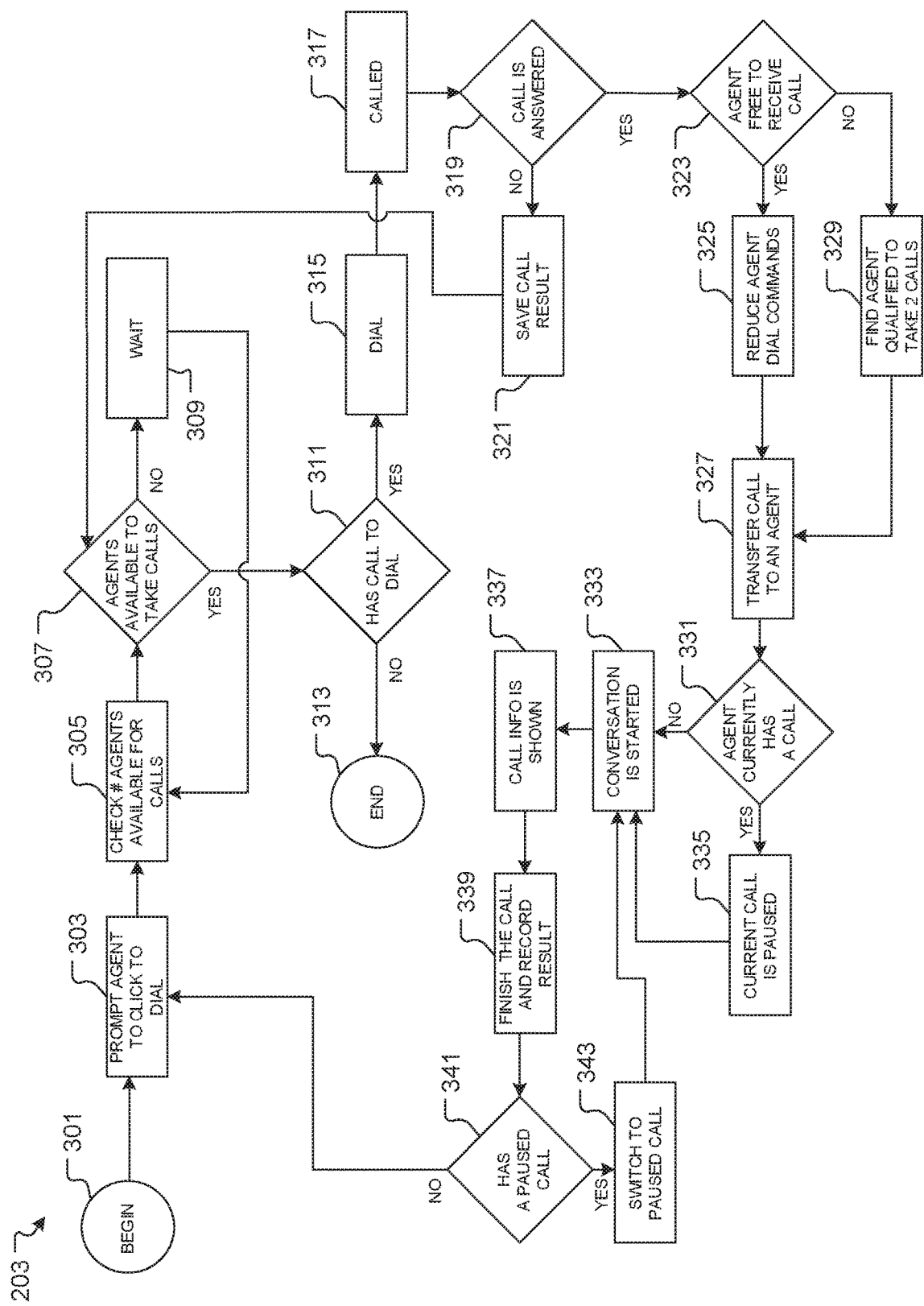
FIG. 3 is a flowchart of the a configuration of the control module of FIG. 2.
Figure 4:
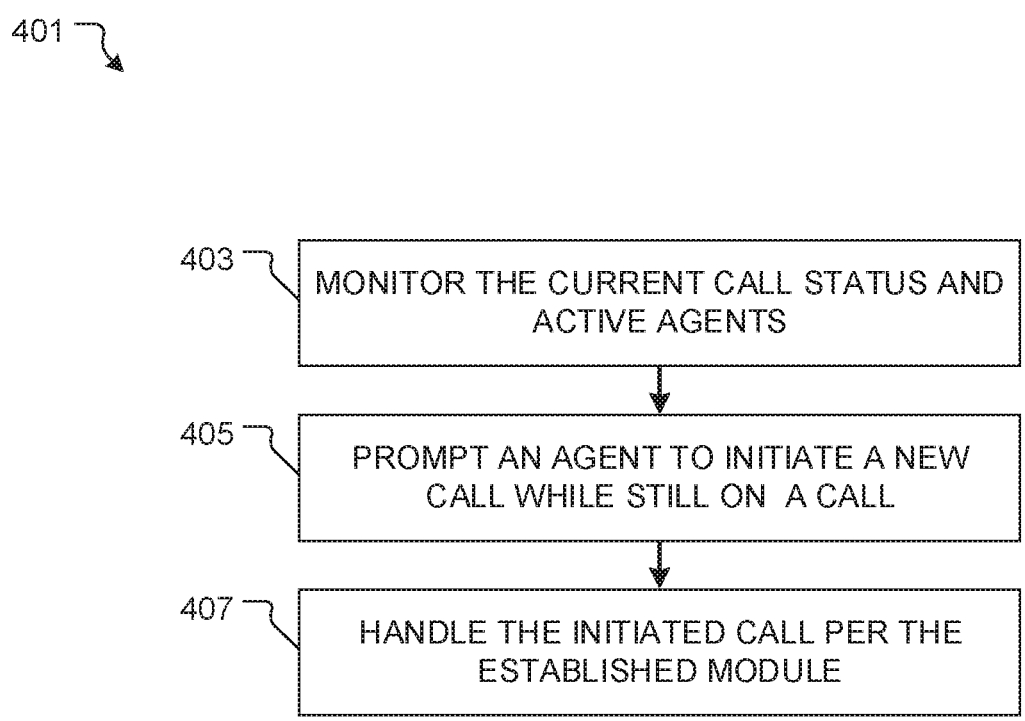
FIG. 4 is a flow chart of an alternative feature for a control module.

The control module 203 enabling the agents to convey information or inquiries to the people 213 as depicted by FIG. 3. Control module 203 including prompting an agent who becomes active in the module 203 to click a button or the like to initiate a call 303. It is contemplated that while the agent initiates a call 303 that the module could select the intended recipient or other aspects of the call but that the module 203 is acting as directed by the agent when the call was initiated.

When the module 203 establishes that agents are available and that calls are initiated the call is allowed to be placed and a response awaited (see 305, 307, 311, 315, 317 and 319). It is contemplated that if agents are in the module 203 but occupied therein, the system 201 will wait 309 until at least one agent is available before allowing calls to be made. It is further contemplated that if for any reason no agents are available and the module 203 of the system 201 is active that it will shut down 313. If a call ends and no answer is obtained it is recorded 321 and the line becomes available for another call.

When a call is answered the module determines which agent should take the call, and if all agents are on a call then the new answered call is routed to an agent qualified to handle multiple calls (see 323, 325, 327, 329, 331, 333 and 335). When an answered call is connected to an agent the module 203 displays the information about the call 337 to the agent, this could include prompts, personal information or the like. When a call is completed, and the results are recorded 339 if the agent has another call on hold/muted 341 they are returned thereto 343 or the module prompts the agent to click to dial a new call 303.

It is contemplated and will be appreciated that the module 203 could utilize additional methods or algorithms to determine how many calls are initiated by each click an agent makes or how many calls to concurrently allow.

It should be appreciated that one of the unique features believed characteristic of the present application is that an agent 311 initiates calls.

In an alternative embodiment 401 the control module 203 includes the ability to monitor the status of the agents in calls 403 and determine the probability of needing to add an additional call or calls and prompting an agent to initiate the additional calls 405. These new additional calls are handled 407 according to the control module 203 wherein this embodiment functions.

It will be understood that capabilities common in the art such as predictive dialing and automatic dialing could be implemented in any of the embodiments without deviating from the intent thereof. It should be appreciated that one of the unique features believed characteristic of the present application is that the Control Module 203 allows for management of multiple calls simultaneously.

Figure 5:
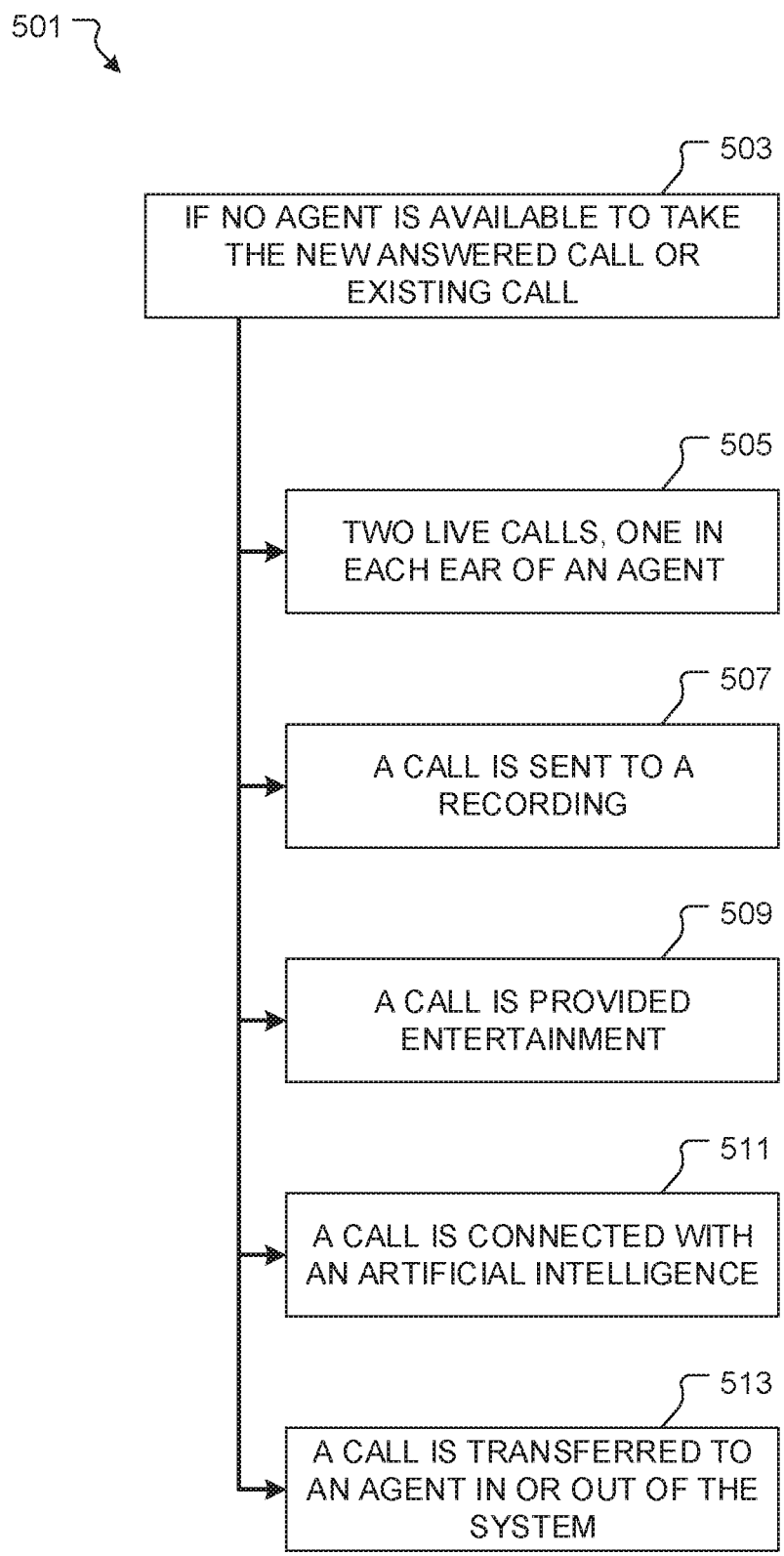
FIG. 5 is a flow chart of a method associated with the present invention.

It is contemplated and is depicted by FIG. 5 that should no agent be free to handle a call that is answered 503 other options exist than those depicted by FIG. 3. Alternative embodiments 501 of these options include enabling an agent to handle two simultaneous calls where one call is placed in a first ear phone and another call is placed in a second ear phone 505. It will be appreciated that the agent could switch their communication between calls.

Additional embodiments 501 include connecting the answered call or an existing call with a pre-recorded message 507 or provided a form of entertainment 509 such as music, a game or the like. Another embodiment 501 includes connecting either the new or existing call with an artificial intelligence 511 that could communicate a message, require input and take action based on the input received. Another embodiment 501 for handling a call with no available agents is that either the new call or an existing call could be transferred to another agent inside of the system or outside thereof 513. In this embodiment, the agent may or may not speak to the customer, for example, they may speak to finish the calling script, to place the customer on hold/mute the customer, or to transfer to an agent or code the call consistent with other system dispositions, the agent may also hand code each abandoned call to ensure proper coding of the call, the agent may take these abandoned calls while already in another call or as their first call. This may help to reduce the number of abandoned live calls. While these embodiments 501 are provided they are not intended as exhaustive or limiting in the action the module can take when a call is answered.

Figure 6:
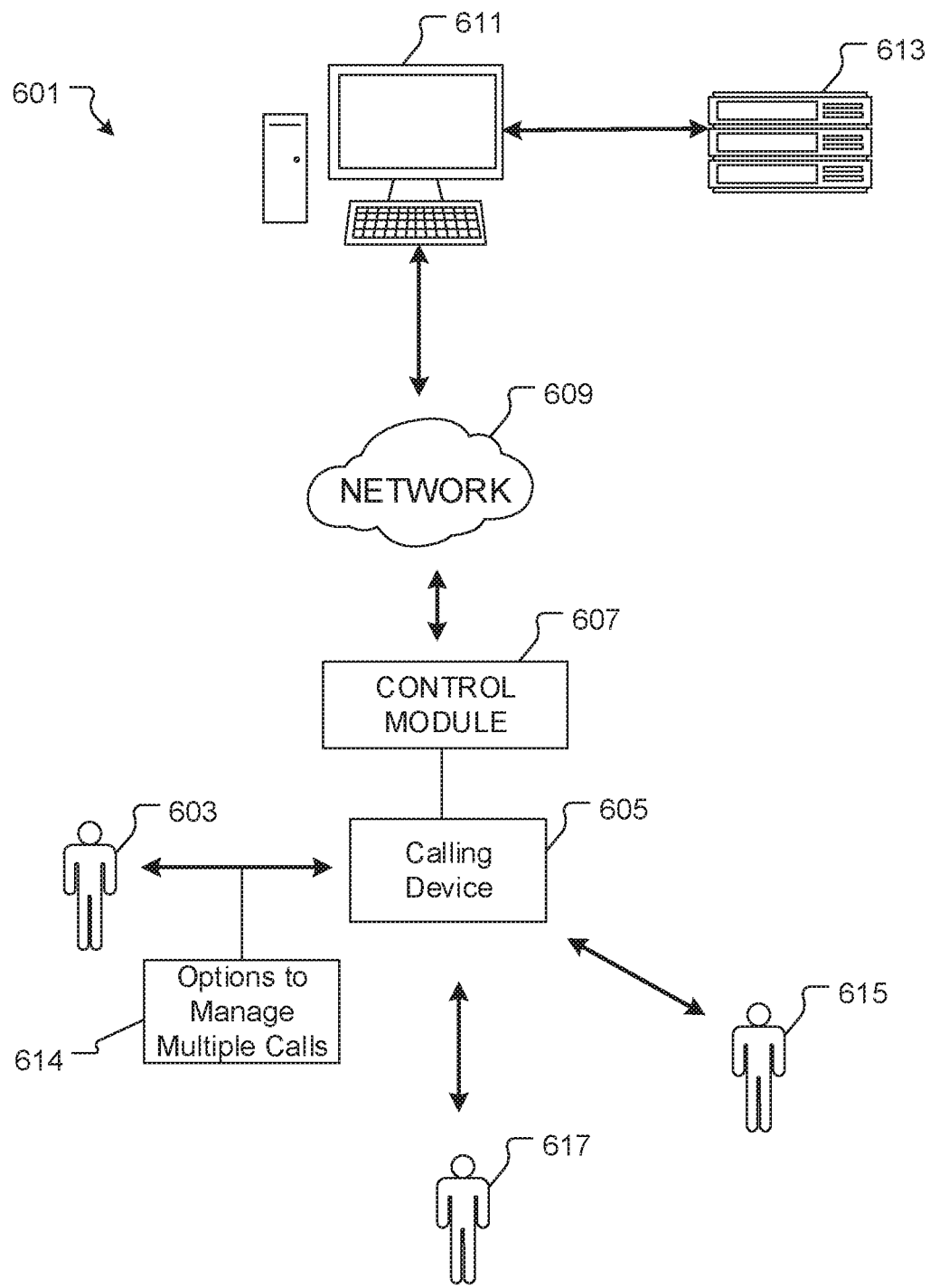
FIG. 6 is an embodiment of a call management system in accordance with an alternative embodiment of the present application.
Figure 7:
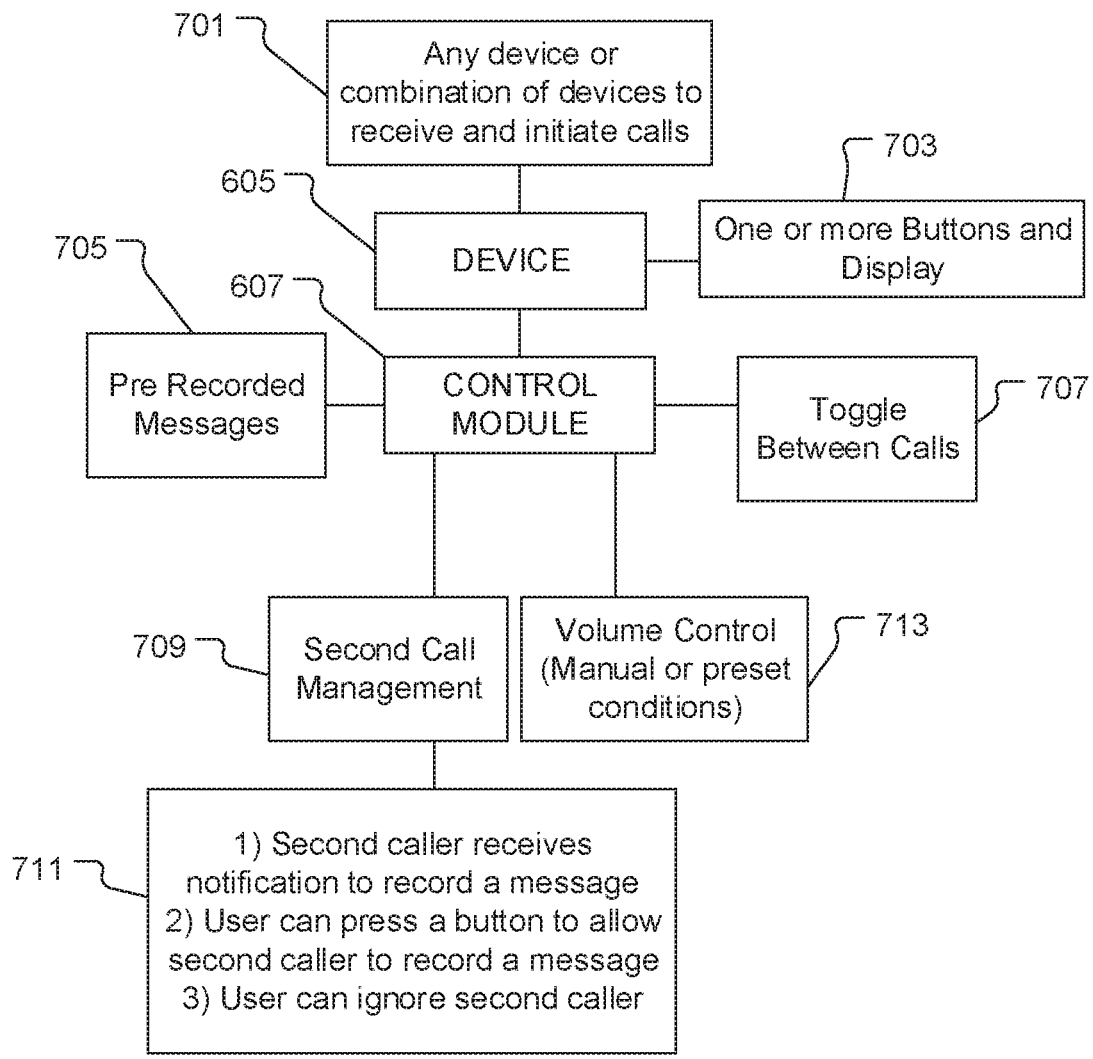
FIG. 7 is a schematic of a call management system with the control module of the present invention.
Figure 8:
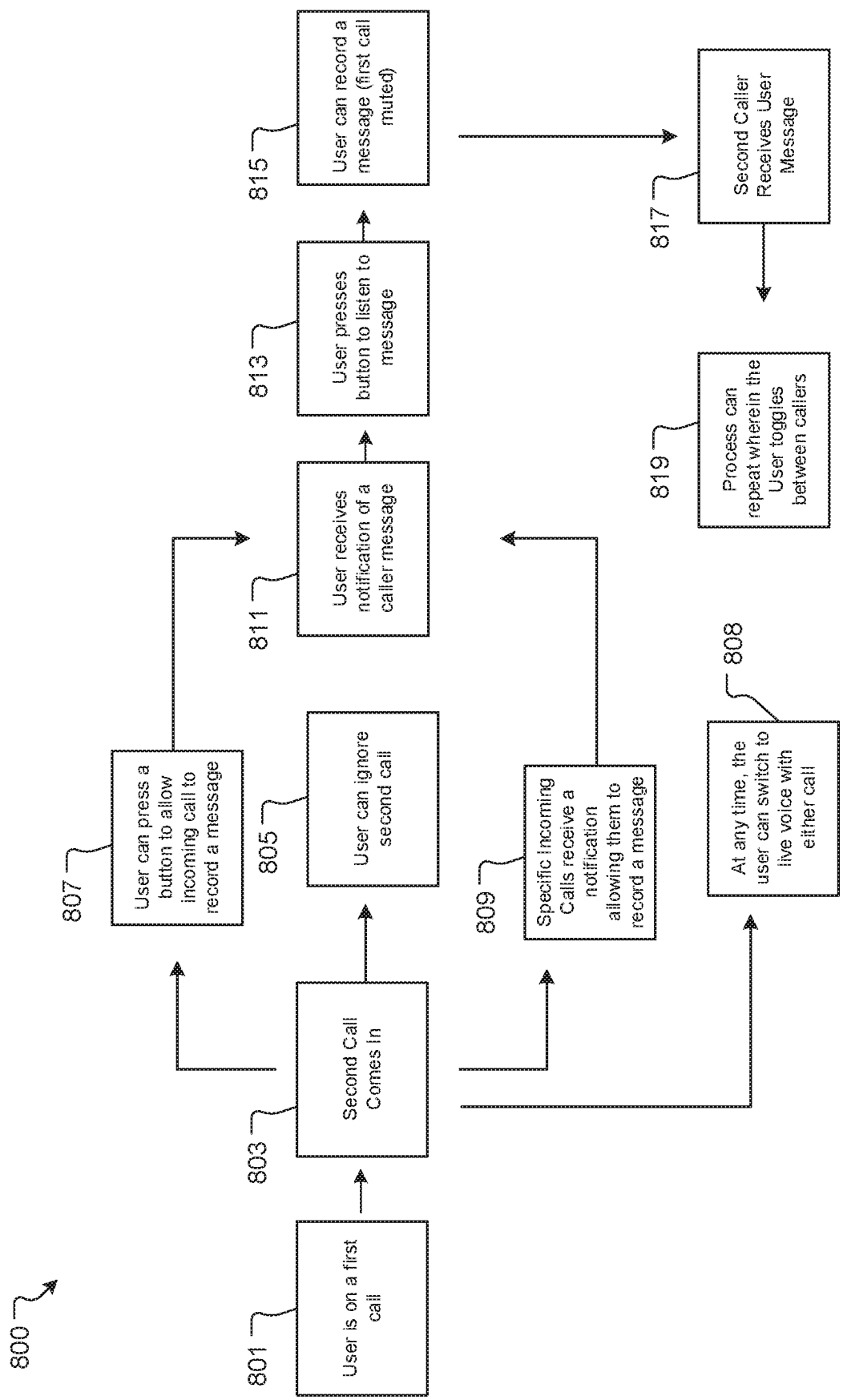
FIG. 8 is a flowchart of the method of the call management system of FIG. 6.

In FIGS. 6-8, an alternative embodiment of a call management system is shown. In FIG. 6, a simplified schematic depicts a call management system 601 having a user 603 using a calling device 605 in communication with a control module 607, a network 609, a CPU 611, and a database 613. In this embodiment, the system 601 is configured to provide a convenient means for the user 603 to manage 614 a plurality of incoming and/or outgoing calls with a plurality of callers 615, 617. It should be appreciated that this system is suitable for use with any calling environment, such as call centers, businesses, homes, cell phones, and any other application in which it may be desirable to manage multiple calls at once.

In FIG. 7, a schematic depicts a simplified explanation of the functionality of the control module 607 in combination with the device 605. Again, it should be appreciated and understood that the device 605 can be any single or combination of devices 701 that can be used for calling. The device 605 can include a display and one or more buttons 703 for operation, and further, it is contemplated that in some embodiments, the one or more buttons 703 are not directly associated with the device, but instead are either associated with another device or are standalone features. The control module 607 can receive and store one or more pre-recorded messages 705 from the user, wherein the pre-recorded messages 705 can be relayed to one or more callers. The control module 607 allows for a user to toggle 707 between calls as needed and provides for a second call management 709 procedure, as will be discussed in detail. The second call management procedure 709 allows for the user to select one or more options 711, including allowing the user to set a default option to allow specific incoming calls to automatically receive a notification allowing them to record a message, or allowing the user to press a button to allow an incoming caller to record a message, or allowing the user to ignore the incoming call altogether. This will be discussed in more detail. The system can further allow for the user to change the volume 713 of any of the plurality of calls, either manually, or based on one or more preset conditions.

It should be appreciated that this system of multi-call management is believed novel and allows for anyone to manage incoming calls effectively.

In FIG. 8, a flowchart 800 further depicts the features and methodology for managing multiple calls at once. As shown, it should be appreciated that the user will be on a first call 801 and receive a second call 803. The user will have options through the control module to manage the second call. As shown, one option is for the user to just ignore the second call 805. This option will send the second caller to voicemail or the like, as is the normal and conventional procedure. The user can designate with the control module that specific incoming calls receive a notification allowing them to record a message 809. For example, the user can use the calling device and the control module to establish that some contacts, such as family, will automatically receive a notification to allow them to record a message for the user. The other option is for the user to be provided with an option to press a button to prompt the second caller to record a message 807. Further, it should be appreciated that at any time the user can switch between recorded messages and live voice 808.

As shown, regardless of how the second caller gets there, if the second caller records a caller message, the user will receive a notification of the message 811. The user can then proceed to press a button to listen to the message 813. Note that the user is still on the line with the first call, therefore the message may play over the first caller, or the first caller may be muted while the message plays. The user can then be prompted to record their own message 815. In some embodiments, the user will be prompted to press another button (which can be the same as the first or separate) to record their own message. The user will record their message while the first call is muted or placed on hold briefly. The user message will then be sent to the second caller 817. It should be appreciated that this process can repeat as desired. Further, it should be appreciated that this system can be expanded to more than two callers.

The system and method of the present invention allows for improved call management, wherein a user can determine which caller(s) they want to speak to and when, as well as which caller(s) can hear them at a time. The control module can use predetermined rules or an interaction with the user to mute or pause calls. The system allows for any of the parties to record messages to be played during the live call. It should be appreciated that messages can not only be voice messages, but also text messages, videos, or any other means.

In some embodiments, the device can include a display, which further facilitates the exchange of information to the user. It should be appreciated that the device may have a display incorporated therein, or alternatively, there can be second devices (such as computer screens or wearable technology) to display information such as the incoming caller.

Figure 9:
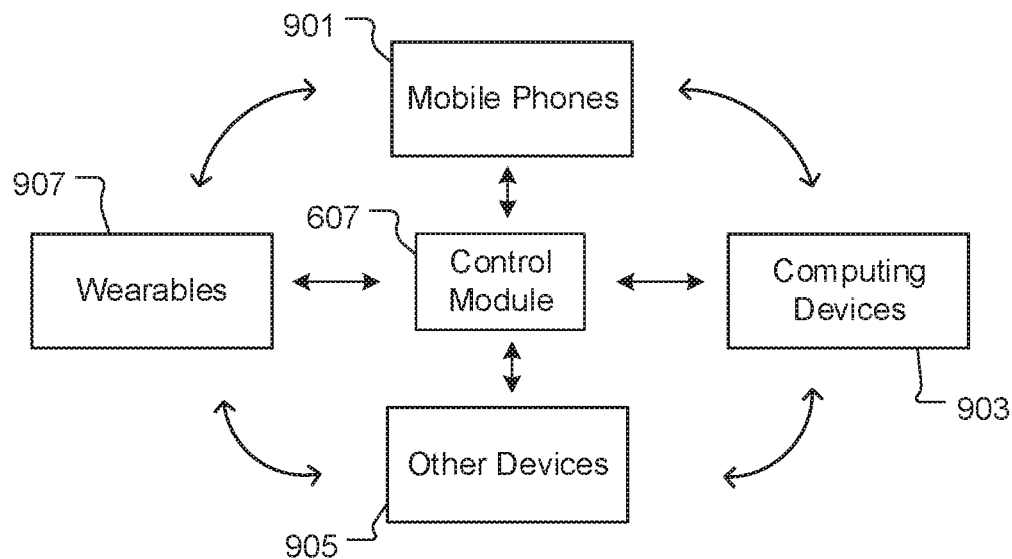
FIG. 9 is a schematic that depicts a network of devices that may be used with the control module of the present invention.

In FIG. 9, a schematic depicts an arrangement of a plurality of devices 901, 903, 905, 907 as an example of a network of devices that may be used in connection with the control module 607 of the present invention. As shown, it should be appreciated that the control module may be adapted for use with any devices, software, or hardware, and may be implemented and run through various devices, including mobile phones as a platform, computing devices, wearable devices, and other devices. This allows for the control module to be adapted for the user's needs. In one specific embodiment, the system utilizes a mobile phone with a mobile application downloaded to the mobile phone.

Figure 10:
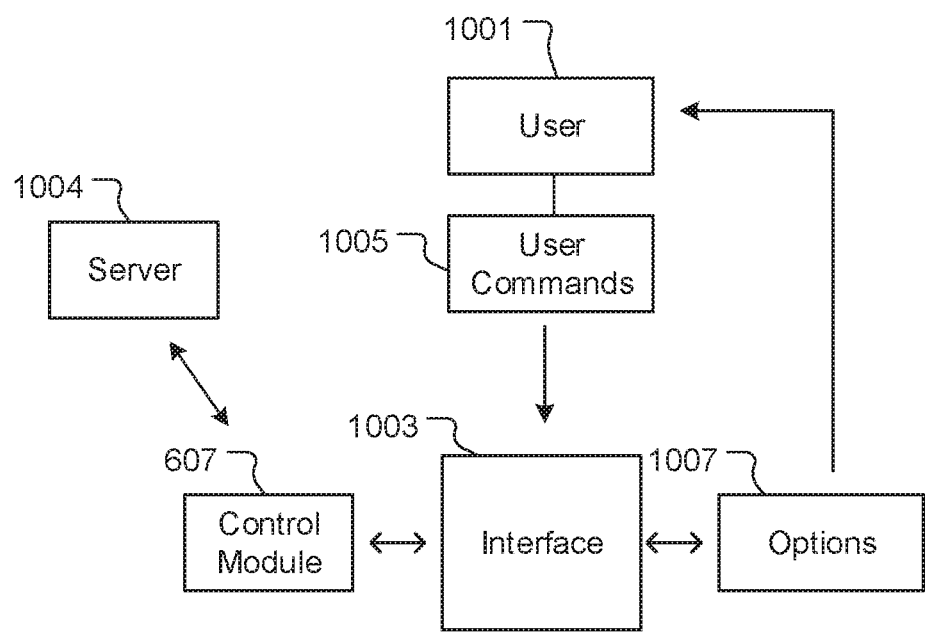
FIG. 10 is a schematic that depicts a simple operation of the control module in accordance with the present invention.

In FIG. 10, another schematic depicts a simple interaction and arrangement of core components. Namely, the system including a user 1001 interacting with a control module 607 such as through an interface 1003 and user commands 1005, wherein the interface provides the user with various options 1007. It should be appreciated that the commands can vary and can include any of the commands discussed herein. In some embodiments, a server 1004 may further be used in communication with the control module, wherein the server will be configured to receive and coordinate calls through the control module to allow for user use of the control module for call management. It should be appreciated that the server may be configured to further receive data from providers to aid in the implementation of the control module. In addition, it should be appreciated that the interface can vary, and is merely an interface to communicate with the user in any form. In some embodiments, the interface may be a mind machine interface.

Figure 11:
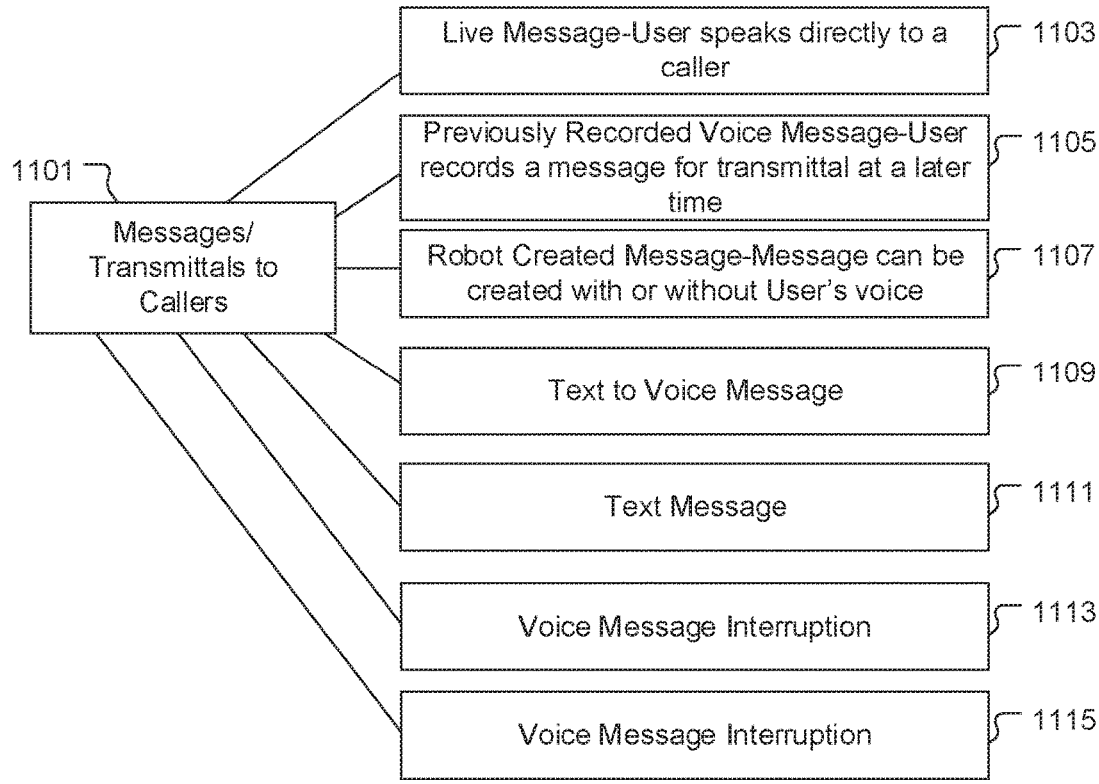
FIG. 11 is a schematic of a plurality of messages contemplated for use with the present invention.

In FIG. 11, a schematic depicts various messages/transmittals 1101 as used in operation of the present invention. It should be appreciated that the messages/transmittals shown are merely some of the contemplated forms of messages, and others may be created or adapted for. As shown, the messages/transmittals may include one or more of: live messages, wherein the user speaks directly to a caller, 1103; previously recorded voice messages, wherein the user records a message for transmittal at a later time, 1105; a robot created message, wherein the message may be formed from the user's voice or a robot voice, 1107; a text to voice message, wherein the user types in a message that is used to create a recording, 1109; a text message, wherein the user types in a message or voice to text message, 1111; a live voicemail interruption, wherein the user interrupts a voicemail message in the making to speak directly to the caller leaving the message, 1113; and a return message, wherein the user can record a return message, such as while on the first call, the control module then being configured to call back the second caller to relay the return message, 1115.

Figure 12:
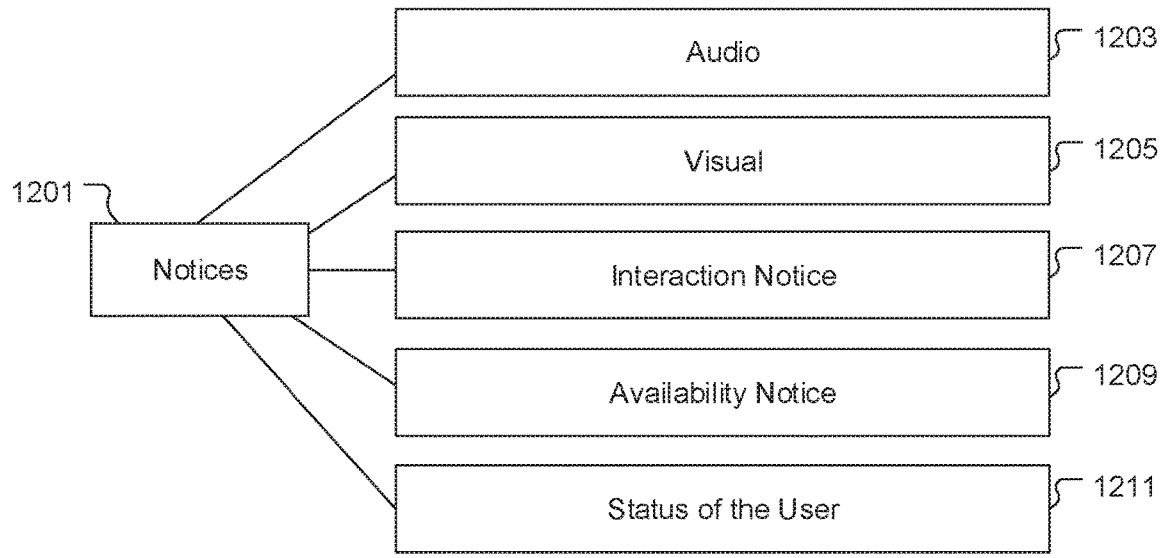
FIG. 12 is a schematic of a plurality of notices contemplated for use with the present invention.

In FIG. 12, a schematic depicts various notices 1201 that the control module may provide to the user or to callers. The notices may include audio notices, such as beeps, 1203; visual notices, such as push notifications, 1205, interaction notices, 1207; availability notices, 1209; and status of the user notices, 1211.

Figure 13:
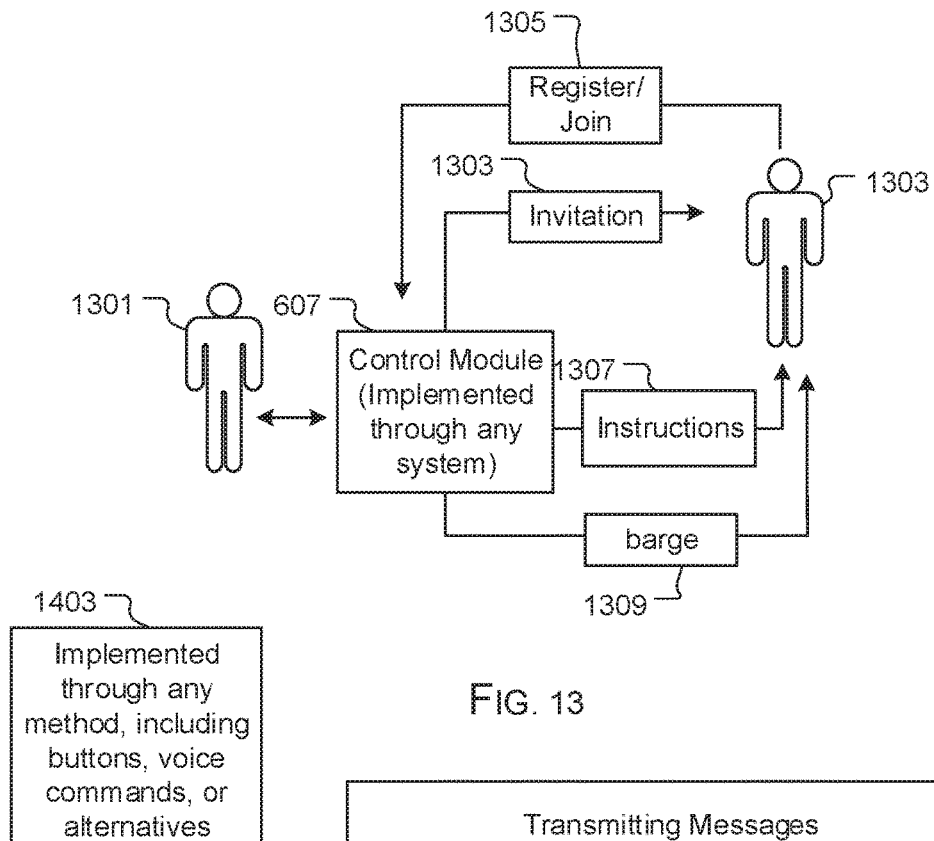
FIG. 13 is a simple schematic depicting an interaction between a user and a secondary user in accordance with the present invention.

In FIG. 13, another schematic depicts the interaction between a user 1301 and a secondary user 1303, which in this scenario is a caller. As shown, the user 1301 can use the control module 607 implemented through any system, to provide various commands and interactions with the secondary user 1303. As shown, the interactions may include an invitation 1305 to join, wherein the secondary user 1303 is invited to join the control module (such as a mobile platform) to become a registered user 1305. It should be appreciated that in some situations, the secondary user may be forced to become a registered user just by the nature of calling the user. The user may further provide instructions 1307, such as instructing the secondary user to leave a message or provide a voice message to be immediately transmitted to the user. In yet other embodiments, the user may designate the secondary user as a barge 1309, which then allows for the secondary user to immediately enter or barge into a call with the user. In embodiments with the barge function, the caller can force a message to the user regardless of the user is available or not. This system can be beneficial in emergency situations.

Figure 14:
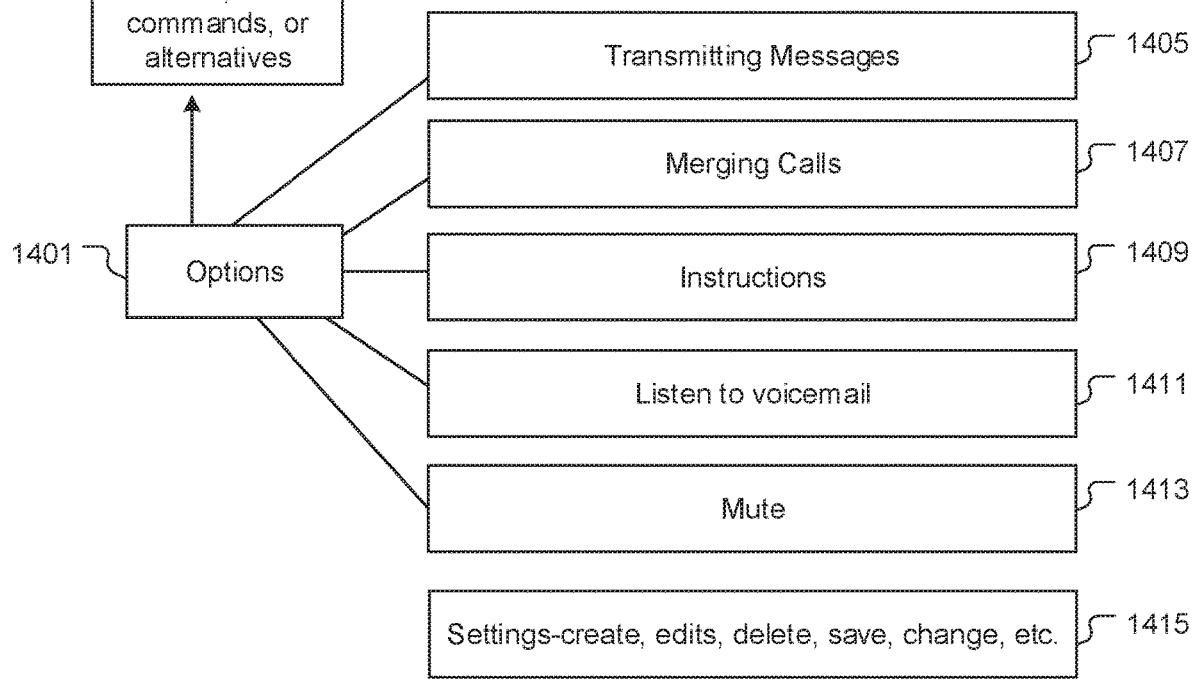
FIG. 14 is a schematic of various options provided to the user in accordance with the present invention.

In FIG. 14, a schematic further depicts various options 1401 available to the user or callers, the options being implemented through any method, such as button pressing, voice commands, or any other 1403. The options include: transmitting messages, 1405; merging calls, 1407; providing instructions, 1409; listening to voicemail, 1411; muting one or more callers, 1413, and implementing settings, 1415.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A call management system, comprising:
a control module configured to be operated via any combination of software and hardware;
the control module configured to perform the steps of:
detect whether a user is on a call;
allow the user to manage multiple calls through providing the user with one or more options for the management of the multiple calls simultaneously;
allow the user to create, edit, delete, and save one or more messages to be implemented through the control module for management of the multiple calls;
instruct one of multiple callers to leave a message; and
play the message to the user while the user is on a call with a second of the multiple callers;
the one or more options including:
a first option to allow the user to communicate live with multiple callers of the multiple calls by transmitting the one or more messages to the multiple calls based off of user commands;
wherein the user can manage and control the multiple calls through operation of the control module.

2. The system of claim 1, wherein the control module is operated through a mobile device and a mobile platform.

3. The system of claim 1, wherein the one or more messages are one of:
a live transmitted voice message;
a previously recorded voice message;
a robot created voice message; and
a return message.

4. The system of claim 1, wherein the control module is further configured to perform the steps of:
sending a notification to a device of the user.

5. The system of claim 4, wherein the notification is one of:
an interaction notice;
an availability notice;
an amount of availability notice; and
a status of the user.

6. The system of claim 1, wherein the control module is further configured to perform the steps of:
sending an invitation to a secondary user to create a registered user out of the secondary user, thereby allowing the secondary user to communicate with the user through the control module, wherein the user can then communicate with the secondary user as one of the multiple calls.

7. The system of claim 1, further comprising:
a first device for receiving and initiating calls;
a second device for receiving an initiating calls; and
the control module operating with the first device and the second device to send the multiple calls to the first device and the second device based on commands.

8. The system of claim 1, wherein the control module is further configured to perform the steps of:
transmit live voice from one of the multiple callers to the user while the user is speaking with a second of the multiple callers.

9. The system of claim 1, wherein the control module is further configured to perform the steps of:
allow the user to mute one or more of the multiple callers.

10. The system of claim 1, wherein the control module is further configured to perform the steps of:
merging the multiple calls together based on a command received from the user or from one of the multiple callers.

11. The system of claim 1, wherein the control module is further configured to perform the steps of:
play a previously recorded voicemail for the user while the user is engaged in one or more of the multiple calls.

12. The system of claim 1, further comprising:
a message generated by the control module;
the control module configured to relay the message to a second caller of the multiple callers while the user is engaged with a first caller of the multiple callers.

13. The system of claim 12, wherein the message includes a voice that is not that of the user.

14. The system of claim 12, wherein the message is generated via textual input from the user.

15. The system of claim 1, wherein the one or more options include:
a second option having one or more buttons configured to be selected by the user, each of the one or more buttons being associated with a command to transmit one or more messages to one or more of the multiple callers.

16. The system of claim 1, wherein the control module is further configured to perform the steps of:
receive a setting from the user to designate one or more of the multiple callers as a barge, wherein the barge has an ability to enter a call with the user as desired by the barge.

17. The system of claim 1, further comprising:
a network of devices configured to communicate via the control module and receive commands from the user.

18. The system of claim 1, further comprising:
a mind machine interface configured to operate with the control module.

19. The system of claim 1, further comprising:
a server configured to communicate with the control module and a provider, the server being configured to collect data from the provider for user with the control module.

\* \* \* \* \*